United States Patent
Seki

(10) Patent No.: US 11,048,259 B2
(45) Date of Patent: Jun. 29, 2021

(54) CONTROL DEVICE

(71) Applicant: SUBARU CORPORATION, Tokyo (JP)

(72) Inventor: Junya Seki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 259 days.

(21) Appl. No.: 16/217,744

(22) Filed: Dec. 12, 2018

(65) Prior Publication Data
US 2019/0243368 A1  Aug. 8, 2019

(30) Foreign Application Priority Data

Feb. 7, 2018   (JP) .............................. JP2018-019927

(51) Int. Cl.
*G05D 1/00*  (2006.01)
*G05D 1/02*  (2020.01)

(52) U.S. Cl.
CPC ......... *G05D 1/0212* (2013.01); *G05D 1/0011* (2013.01); *G05D 1/0221* (2013.01); *G05D 1/0088* (2013.01)

(58) Field of Classification Search
None
See application file for complete search history.

(56) References Cited

U.S. PATENT DOCUMENTS

2009/0081011 A1\* 3/2009 Kaufmann ............... E04H 6/225
  414/229
2010/0070168 A1\* 3/2010 Sumcad ............. G01C 21/3438
  701/467

(Continued)

FOREIGN PATENT DOCUMENTS

JP  2000-322683 A   11/2000
JP  2001-357497 A   12/2001

(Continued)

OTHER PUBLICATIONS

Japanese Notice of Reaosns for Refusal issued in corresponding Japanese Patent Application No. 2017-168587, dated Nov. 12, 2019, with English translation.

(Continued)

*Primary Examiner* — Redhwan K Mawari
*Assistant Examiner* — Melanie J Patrick
(74) *Attorney, Agent, or Firm* — McDermott Will & Emery LLP

(57) ABSTRACT

A control device is configured to cause a vehicle parked in a parking lot to move to a pick-up area in accordance with a call from a user who is a passenger of the vehicle. The control device includes a user position acquiring unit, a predicted time calculator, and a timing manager. The user position acquiring unit is configured to acquire, as a user position, a current position of the user who has made the call. The predicted time calculator is configured to calculate a predicted user arrival time on the basis of the user position, and the predicted user arrival time is a time in which the user is predicted to arrive at the pick-up area. The timing manager is configured to manage a movement start timing at which the vehicle to be called starts moving to the pick-up area on the basis of the predicted user arrival time.

17 Claims, 7 Drawing Sheets

(56) References Cited

U.S. PATENT DOCUMENTS

| | | | | |
|---|---|---|---|---|
| 2014/0200804 A1* | 7/2014 | Wippler | ............ | G01C 21/3611 |
| | | | | 701/465 |
| 2015/0073645 A1* | 3/2015 | Davidsson | ............ | B60W 30/06 |
| | | | | 701/23 |
| 2016/0055605 A1* | 2/2016 | Kim | ...................... | G06Q 50/30 |
| | | | | 701/465 |
| 2018/0209803 A1* | 7/2018 | Rakah | .................. | G01C 21/343 |
| 2018/0308064 A1* | 10/2018 | Glaser | ................ | G06Q 10/1093 |
| 2018/0322431 A1* | 11/2018 | Folck | ................ | G06Q 30/0601 |
| 2018/0341274 A1* | 11/2018 | Donnelly | ................ | H04W 4/46 |
| 2019/0101918 A1* | 4/2019 | Mukaiyama | ........... | G08G 1/146 |
| 2019/0164431 A1* | 5/2019 | Kataoka | ................ | G06Q 10/02 |
| 2019/0178656 A1* | 6/2019 | Stegall | ................... | G08G 1/202 |
| 2020/0174494 A1* | 6/2020 | Lessels | ..................... | B60P 3/20 |
| 2020/0242924 A1* | 7/2020 | Publicover | ............ | G08G 1/147 |

FOREIGN PATENT DOCUMENTS

| | | | |
|---|---|---|---|
| JP | 2003-276543 A | | 10/2003 |
| JP | 2009-245221 A | | 10/2009 |
| JP | 2015-161967 A | | 9/2015 |
| JP | 2015-176468 A | | 10/2015 |
| JP | 2018181304 A | * | 11/2018 |

OTHER PUBLICATIONS

Japanese Notice of Reasons for Refusal issued in corresponding Japanese Patent Application 2018-019927, dated Jun. 9, 2020, with English translation.

* cited by examiner

CONTROL DEVICE

CROSS-REFERENCE TO RELATED APPLICATIONS

The present application claims priority from Japanese Patent Application No. 2018-019927 filed on Feb. 7, 2018, the entire contents of which are hereby incorporated by reference.

BACKGROUND

1. Technical Field

The present invention relates to the technical field of control devices that cause a vehicle parked in a parking lot to move to a pick-up area in accordance with a call from a user who is a passenger.

2. Related Art

For example, among systems for assisting in parking vehicles, an automated valet parking system is being considered. The automated valet parking system automates valet parking by utilizing autonomous driving technology for vehicles, and the assumption is that the vehicles are controlled, for example, by a control device, playing a main role, disposed in an establishment that supports valet parking, such as a hotel or a large-scale commercial establishment. Specifically, in the automated valet parking system, a user, who is a passenger (including a driver), stops a vehicle at a predetermined drop-off area and gets off the vehicle. Then, the vehicle moves to a necessary parking lot (parking space) and parks itself through autonomous driving. Thereafter, in response to a call from the user, the control device causes the vehicle to move from the parking lot to a predetermined pick-up area to pick up the user through autonomous driving.

The drop-off area and the pick-up area may be the same area in some cases.

Related technology is disclosed in Japanese Unexamined Patent Application Publication No. 2015-176468.

SUMMARY OF THE INVENTION

An aspect of the present invention provides a control device configured to cause a vehicle parked in a parking lot to move to a pick-up area in accordance with a call from a user who is a passenger of the vehicle. The control device includes a user position acquiring unit configured to acquire, as a user position, a current position of the user who has made the call; a predicted time calculator configured to calculate a predicted user arrival time on the basis of the user position, the predicted user arrival time being a time in which the user is predicted to arrive at the pick-up area; and a timing manager configured to manage a movement start timing at which the vehicle to be called starts moving to the pick-up area on the basis of the predicted user arrival time.

An aspect of the present invention provides a control device configured to cause a vehicle parked in a parking lot to move to a pick-up area in accordance with a call from a user who is a passenger of the vehicle. The control device includes circuitry. The circuitry is configured to acquire, as a user position, a current position of the user who has made the call. The circuitry is configured to calculate a predicted user arrival time on the basis of the user position, the predicted user arrival time being a time in which the user is predicted to arrive at the pick-up area. The circuitry is configured to manage a movement start timing at which the vehicle to be called starts moving to the pick-up area on the basis of the predicted user arrival time.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

Of the automated valet parking system as described above, a system that causes a vehicle in a parking lot to move to a pick-up area to pick up a user in accordance with a call from the user will mainly be described. This system will be referred to as a pick-up system, hereinafter.

A possible issue with the pick-up system is that the time it takes for the user who makes a call to arrive at a pick-up area may differ for different users. Therefore, if a vehicle is moved to the pick-up area at a timing at which a call is made, the vehicle may arrive at the pick-up area too early for some users, and the vehicle may be kept for a long time at the pick-up area. In other words, the vehicle may occupy the pick-up area for a long time to pick up the user.

If a vehicle occupies the pick-up area for a long time in this manner, the pick-up area may become congested. If a large number of vehicles occupy the pick-up area for a long time, other vehicles behind may not be allowed to enter the pick-up area. Such a situation forces other users who are not arriving late to wait for a long time at the pick-up area and is thus not desirable.

It is desirable to prevent a situation in which a vehicle that has arrived at a pick-up area occupies the pick-up area for a long time while waiting for the user to arrive and to ease any congestion at the pick-up area.

1. Configuration of Pick-Up System

Figure 1:
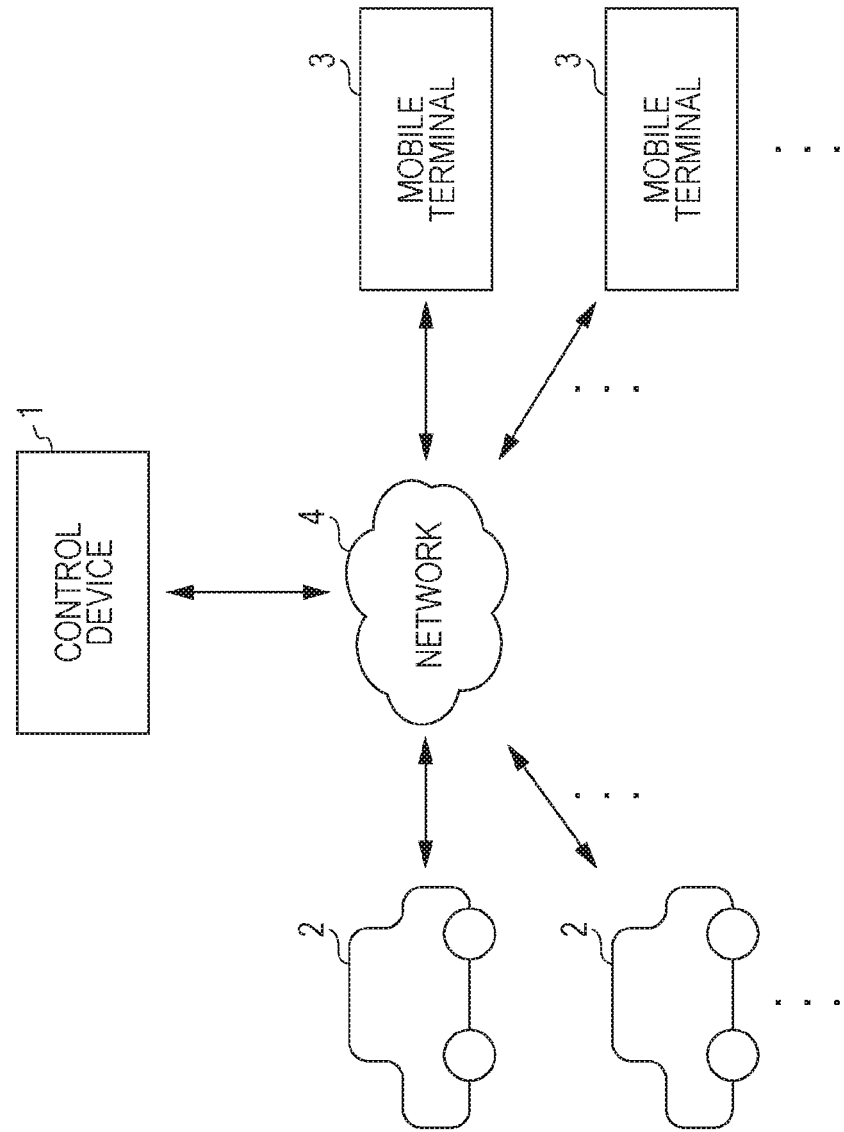
FIG. 1 illustrates a configuration of a pick-up system that includes a control device according to an example.
Figure 2:
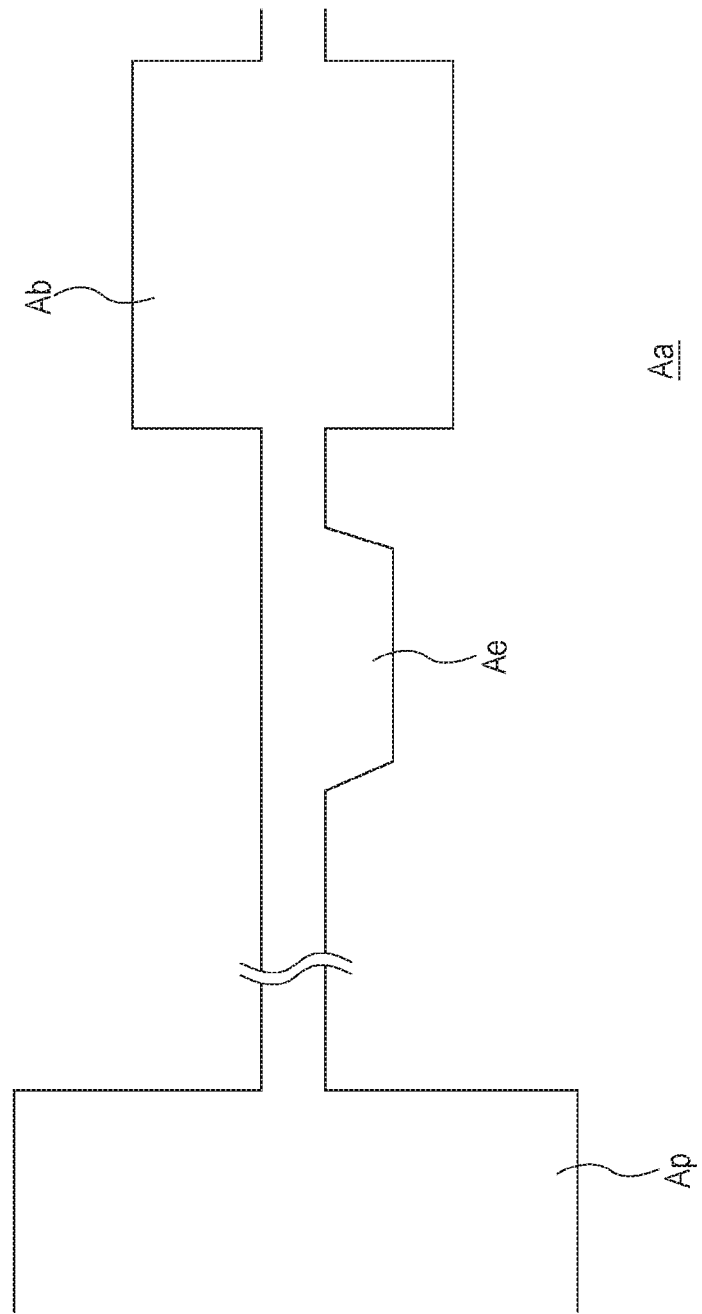
FIG. 2 is a schematic diagram of a vehicle passable region defined in an establishment that supports valet parking to which the pick-up system according to an example is applied.

FIG. 1 illustrates a configuration of a pick-up system that includes a control device 1 according to an example of the present invention, and this pick-up system will be referred to as a pick-up system according to an example, hereinafter. FIG. 2 is a schematic diagram of a vehicle passable region Aa defined in an establishment that supports valet parking to which the pick-up system is applied.

As illustrated in FIG. 1, the pick-up system according to the example includes the control device 1, a plurality of vehicles 2, a plurality of mobile terminals 3, and a network 4. The network 4 is, for example, a communication network, such as the internet or a local area network (LAN). The control device 1 can communicate with the vehicles 2 and the mobile terminals 3 via the network 4. In this example, the vehicles 2 and the mobile terminals 3 can also communicate with each other via the network 4.

The control device 1 is a computer device managed at an establishment that supports valet parking. The vehicles 2 are each a vehicle that a user using the establishment that supports valet parking uses. The mobile terminals 3 are each a mobile computer device used by a user.

As illustrated in FIG. 2, in the vehicle passable region Aa in the establishment that supports valet parking, a parking lot Ap, a pick-up area Ab, and a temporary refuge area Ae are defined. A passage through which the vehicles 2, described later, can pass couples the parking lot Ap and the temporary refuge area Ae to each other and the temporary refuge area Ae and the pick-up area Ab to each other. The vehicles 2 can thus move between the parking lot Ap, the pick-up area Ab, and the temporary refuge area Ae.

A plurality of parking spots are provided in the parking lot Ap, and a plurality of vehicles 2 can be parked in the parking lot Ap. The pick-up area Ab is an area where passengers get on the vehicles 2, and the pick-up area Ab can house a plurality of vehicles in this example. The temporary refuge area Ae is an area that temporarily houses the vehicles 2 that are waiting to enter the pick-up area Ab. The temporary refuge area Ae can house a plurality of vehicles 2 in this example.

A gate having an operable bar, for example, can be provided at an entrance of the pick-up area Ab through which the vehicles 2 enter from the parking lot Ap.

In the automated valet parking system of this example, a vehicle having an autonomous driving function is used as the vehicle 2. A passenger of the vehicle 2 drives the vehicle 2 to a predetermined drop-off area provided in an establishment that supports valet parking. The vehicle 2 may be manually driven or autonomously driven. Upon the user, or the passenger (including the driver), arriving at the drop-off area and getting off the vehicle 2, the vehicle 2 moves and parks itself in the parking lot Ap through autonomous driving in response to, for example, a parking instruction from the user. The parking instruction may be, for example, input to the vehicle 2 or issued to the vehicle 2 via the mobile terminal 3.

At this point, the control device 1 manages information on an available parking spot in the parking lot Ap and instructs the vehicle 2 moving from the drop-off area to the parking lot Ap as described above to park itself in the available parking spot. For example, a parking spot identifier is assigned to each parking spot in such a manner that the vehicle 2 can identify the parking spot. For example, a parking spot number is indicated in each parking spot. The control device 1 manages the availability of each parking spot with the identifiers. Upon receiving the parking spot identifier of an available parking spot from the control device 1, the vehicle 2 parks itself in the parking spot specified by the parking spot identifier through the autonomous driving function.

In the automated valet parking system of this example, the user can instruct the control device 1 to call the user's vehicle 2 in the parking lot Ap (into the pick-up area Ab) by operating the mobile terminal 3.

Upon receiving this calling instruction, the control device 1 instructs the corresponding vehicle 2 to move to the pick-up area Ab to pick up the user at the pick-up area Ab.

A characteristic feature of the present example lies on the system (i.e., the pick-up system) that causes the vehicle 2 parked in the parking lot Ap to move to the pick-up area Ab in response to a calling instruction from the user as described above, and details of this system will be described later.

In the pick-up system according to the example, the number of the vehicles 2 and the number of the mobile terminals 3 may vary depending on the number of system users and may each be one.

2. Configuration of Each Device

Figure 3:
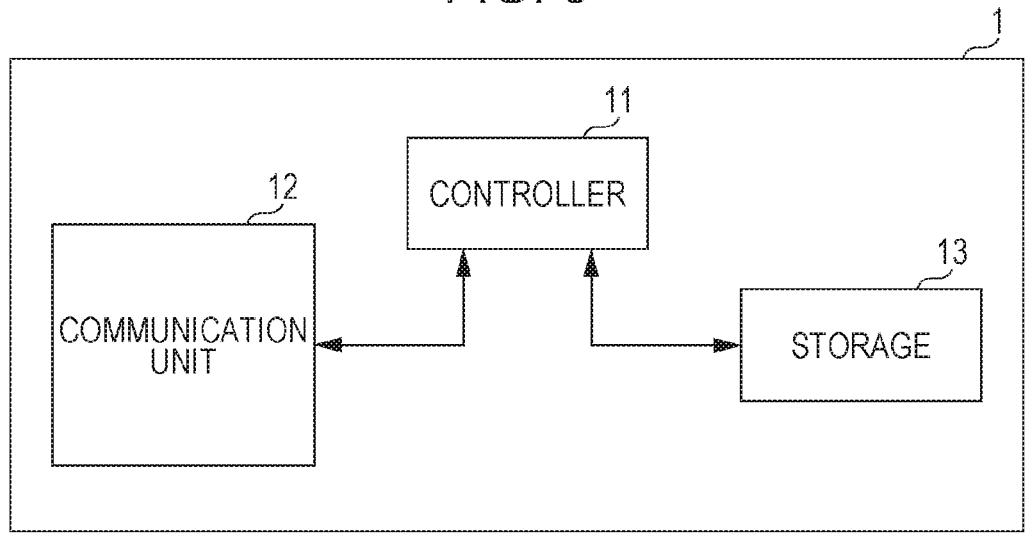
FIG. 3 is a block diagram illustrating an internal configuration example of a control device according to an example.

FIG. 3 is a block diagram illustrating an internal configuration example of the control device 1.

As illustrated in FIG. 3, the control device 1 includes a controller 11, a communication unit 12, and a storage 13. The controller 11 includes a microcomputer having, for example, a central processing unit (CPU), a read-only memory (ROM), and a random-access memory (RAM). A necessary operation of the control device 1 is implemented as the CPU executes processing that is based on a program stored in the ROM.

The communication unit 12 transmits and receives data to and from an external device via the network 4 in accordance with an instruction from the controller 11. Specific examples of the external device include the vehicles 2 and the mobile terminals 3 in the present example. The controller 11 can carry out data communication with the external device via the communication unit 12.

The communication unit 12 and the network 4 may be coupled to each other with a cable or wirelessly.

The storage 13 is constituted, for example, by a storage device, such as a flash memory or a hard disk drive (HDD), and is used for the controller 11 to store various pieces of data. The storage 13 can store, for example, various pieces of data necessary for controlling the vehicle 2, such as data pertaining to available parking spots in the parking lot Ap described above.

Figure 4:
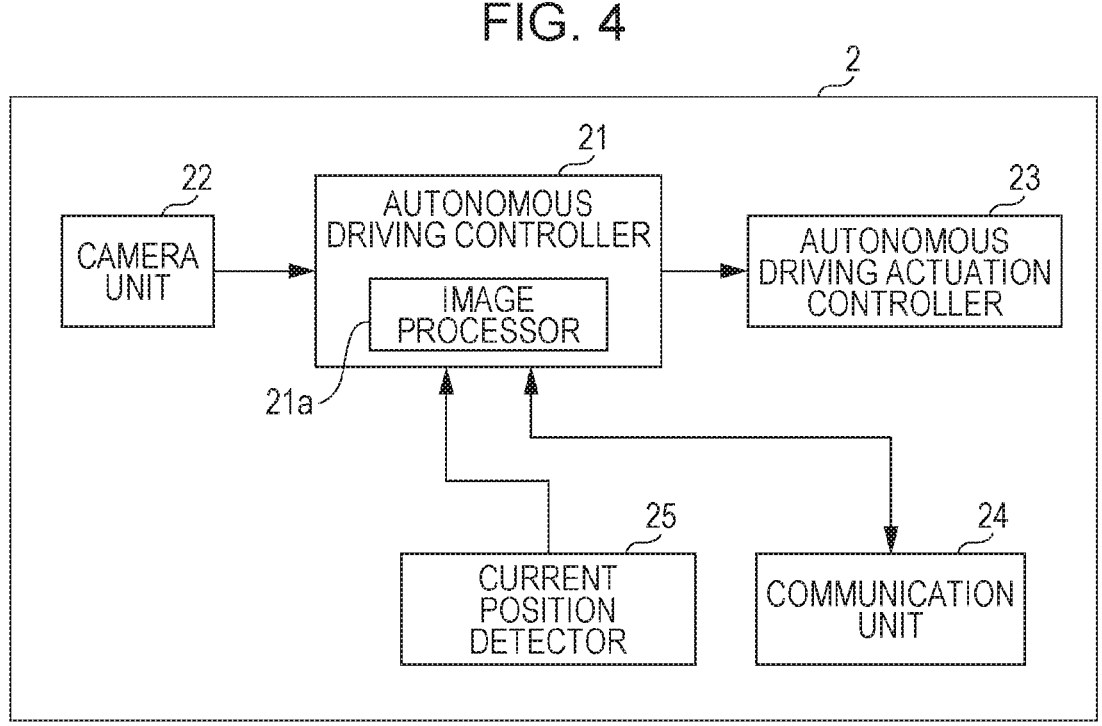
FIG. 4 is a block diagram illustrating an electrical configuration pertaining to autonomous driving included in a vehicle used in an example.

FIG. 4 is a block diagram illustrating an electrical configuration pertaining to autonomous driving provided in the vehicle 2.

The vehicle 2 of this example includes an autonomous driving controller 21, a camera unit 22, an autonomous driving actuation controller 23, a communication unit 24, and a current position detector 25.

The autonomous driving controller 21 includes a microcomputer having a CPU and a memory (storage device), such as a ROM or a RAM. The autonomous driving controller 21 carries out control to implement the autonomous driving function of the vehicle 2. The autonomous driving function herein is a function that implements at least the movement of the vehicle 2 between the drop-off area, the parking lot Ap, the temporary refuge area Ae, and the pick-up area Ab described above and the autonomous parking of the vehicle 2 into a parking spot in the parking lot Ap.

The autonomous driving controller 21 can acquire current position information with the current position detector 25 (e.g., a global navigation satellite system (GNSS) sensor) that detects the current position of the vehicle 2. In addition, map information, for example, is stored in an internal memory, such as the ROM described above, and the autonomous driving controller 21 carries out various control operations for autonomous driving in accordance with the current position information, the map information, and images captured by one or more cameras in the camera unit 22. A camera in the camera unit 22 captures an image in a direction away from the vehicle. The autonomous driving controller 21 includes an image processor 21a, and the image processor 21a analyzes an image captured by the camera in the camera unit 22. Thus, the autonomous driving controller 21 recognizes an environment outside the vehicle. For example, the autonomous driving controller 21 detects an object present outside the vehicle and recognizes the detected object to recognize the environment outside the vehicle. Then, the autonomous driving controller issues various instructions to the autonomous driving actuation controller 23 in accordance with the recognition result on the environment outside the vehicle, the current position information, and the map information. Thus, the autonomous driving controller 21 implements autonomous driving.

The autonomous driving actuation controller 23 inclusively represents a steering control electric control unit (ECU) that controls actuation of a steering actuator (e.g., an actuator capable of changing a steering angle, such as a power steering motor), a vehicle propulsion control ECU that controls actuation of a vehicle propulsion device-related actuator, a brake control ECU that controls actuation of a brake-related actuator (e.g., a hydraulic control actuator for controlling an output fluid pressure from a brake booster to a master cylinder or a fluid pressure within a brake fluid pipe), and a transmission control ECU that controls actuation of a transmission-related actuator (an actuator for shifting gears or switching between forward and reverse driving).

The vehicle propulsion device-related actuator can, for example, be a throttle actuator that actuates a throttle valve or various actuators related to actuating the engine, such as an injector that carries out fuel injection, in a case in which the vehicle 2 is an engined vehicle or can, for example, be a driving motor in a case in which the vehicle 2 is an electric vehicle.

The autonomous driving controller 21 issues, to the autonomous driving actuation controller 23, an instruction on the steering amount or the like, an instruction related to the vehicle propulsion such as the accelerator position, an instruction on the on/off of the brake, and an instruction on the forward/reverse movement of the vehicle 2 in accordance with the recognition result of the environment outside the vehicle, the current position information of the vehicle 2, and the map information. Thus, the autonomous driving controller 21 implements autonomous driving.

Specific techniques for the autonomous driving control is not directly related to the present invention, and thus detailed descriptions thereof will be omitted.

The communication unit 24 is coupled to the autonomous driving controller 21. The communication unit 24 transmits and receives data to and from an external device via the network 4. Specific examples of the external device include the control device 1 and the mobile terminals 3 in the present example. The autonomous driving controller 21 can carry out data communication with the external device via the communication unit 24.

In this example, the communication unit 24 and the network 4 are coupled to each other wirelessly but can also be coupled to each other with a cable.

Figure 5:
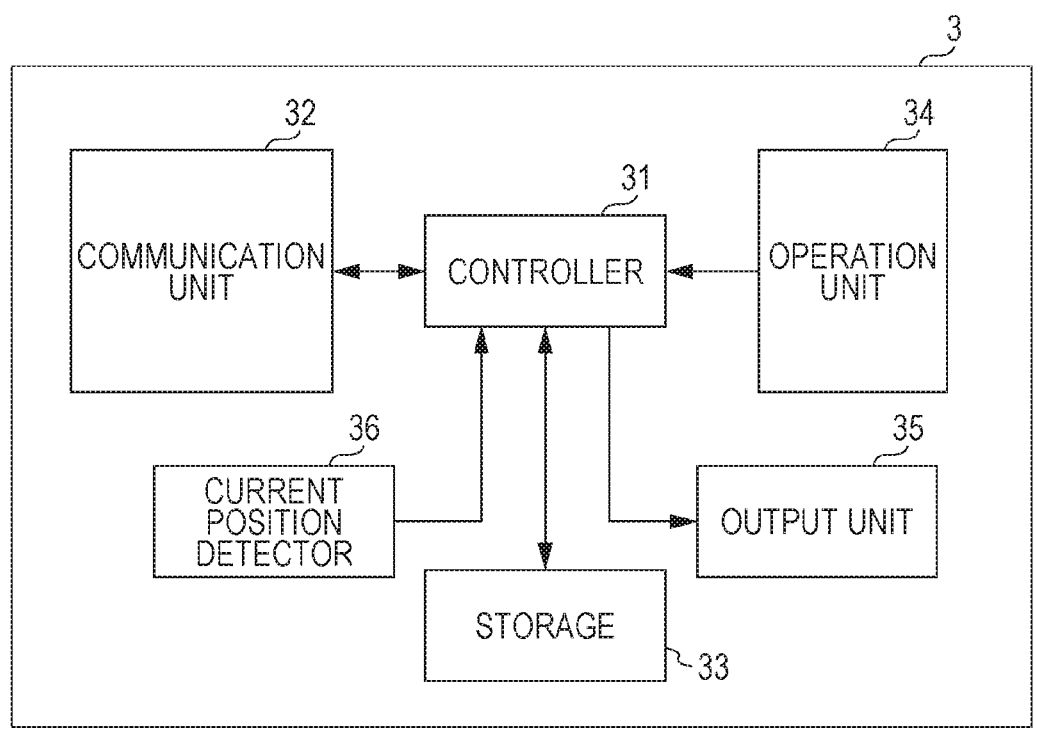
FIG. 5 is a block diagram illustrating an internal configuration example of a mobile terminal used in an example.

FIG. 5 is a block diagram illustrating an internal configuration example of the mobile terminal 3.

The mobile terminal 3 can be, for example, a mobile information processing terminal, such as a mobile phone (e.g., a smartphone) or a tablet terminal.

The mobile terminal 3 includes a controller 31, a communication unit 32, a storage 33, an operation unit 34, an output unit 35, and a current position detector 36.

The controller 31 includes a microcomputer having, for example, a CPU, a ROM, and a RAM. A necessary operation of the mobile terminal 3 is implemented as the CPU executes processing that is based on a program stored in the ROM.

The communication unit 32 transmits and receives data to and from an external device via the network 4 in accordance with an instruction from the controller 31. Specific examples of the external device include the control device 1 and the vehicles 2 in the present example. The controller 31 can carry out data communication with the external device via the communication unit 32.

In this example, the communication unit 32 and the network 4 are coupled to each other wirelessly but can also be coupled to each other with a cable.

The storage 33 is constituted, for example, by a storage device, such as a flash memory or a hard disk drive (HDD), and is used for the controller 31 to store various pieces of data.

The operation unit 34 includes various operators provided in the mobile terminal 3. The operation unit 34 outputs operation information corresponding to an operation to the controller 31. Examples of the operators in the operation unit 34 include various buttons and a touch panel.

The output unit 35 inclusively represents a device for outputting various pieces of information to the user, such as a speaker and various display devices including, for example, a liquid-crystal display or an organic electro-luminescence (EL) display provided in the mobile terminal 3.

The output unit 35 outputs various pieces of information (screen display or sound output) in accordance with an instruction from the controller 31.

The current position detector 36 includes, for example, a GNSS sensor and detects a current position of the mobile terminal 3. The controller 31 can acquire current position information detected by the current position detector 36.

In the mobile terminal 3 of this example, an application program for the pick-up system is stored, for example, in a storage device, such as the storage 33, that can be read by the controller 31.

This application for the pick-up system implements a function that provides a calling operation screen for the user to call for the vehicle 2 and provides a rescheduling information input screen for the user to input information on scheduling in response to a rescheduling request, described later, from the control device 1.

In this example, to call the user's vehicle 2 in the parking lot Ap to the pick-up area Ab, the user starts the application for the pick-up system and carries out a predetermined operation on the calling operation screen provided by the stated application.

Although the description through illustration is omitted, the mobile terminal 3 of this example has a function (payment function) of making a payment for a purchase with electronic money. As the payment for a purchase is made with electronic money through this function, the controller 31 can transmit information indicating the purchase price (monetary amount paid for the purchase) to the control device 1 (controller 11) via the communication unit 32.

Processing carried out by the control device 1 on the basis of the information on the monetary amount paid for the purchase will be described later.

3. Method of Identifying Vehicle to be Called

In the pick-up system according to the example, when receiving a call from the user (mobile terminal 3), the control device 1 identifies the vehicle 2 of the user who has made the call among the vehicles 2 in the parking lot Ap and instructs the identified vehicle 2 to move to the pick-up area Ab.

To achieve this, the control device 1 (controller 11) needs to grasp the correspondence relationship between the users and the vehicles 2. Various techniques are conceivable for the control device 1 to grasp the correspondence relationship, and there is no particular limitation on a specific technique. One example of the techniques will be illustrated below.

First, the vehicle 2 (autonomous driving controller 21) makes an inquiry to the control device 1 as to an available parking spot when moving to the parking lot Ap in accordance with a parking instruction from the user.

At this point, the control device 1 acquires, from the vehicle 2, predetermined vehicle information that allows the vehicle 2 to be uniquely identified, such as the vehicle identification number of the vehicle 2 (hereinafter, referred to as "vehicle identification information"). Thus, the control device 1 can grasp the vehicle identification information of the parked vehicles in the respective parking spots.

Meanwhile, the user sets the vehicle identification information of the user's vehicle 2 into the application for the pick-up system described above as initial setting or the like of the application. Then, when calling the vehicle 2, the application for the pick-up system transmits, to the control device 1, the set vehicle identification information along with information of the calling instruction.

Thus, the control device 1 can identify the vehicle 2 to be called on the basis of the vehicle identification information when the vehicle 2 is called.

4. Pick-Up Control Processing of Example

Hereinafter, pick-up control processing, serving as an example, executed by the control device 1 will be described with reference to the flowcharts illustrated in FIGS. 6 to 8. The pick-up control processing is related to how a corresponding vehicle 2 is moved to the pick-up area Ab in response to a call from the user.

Figure 6:
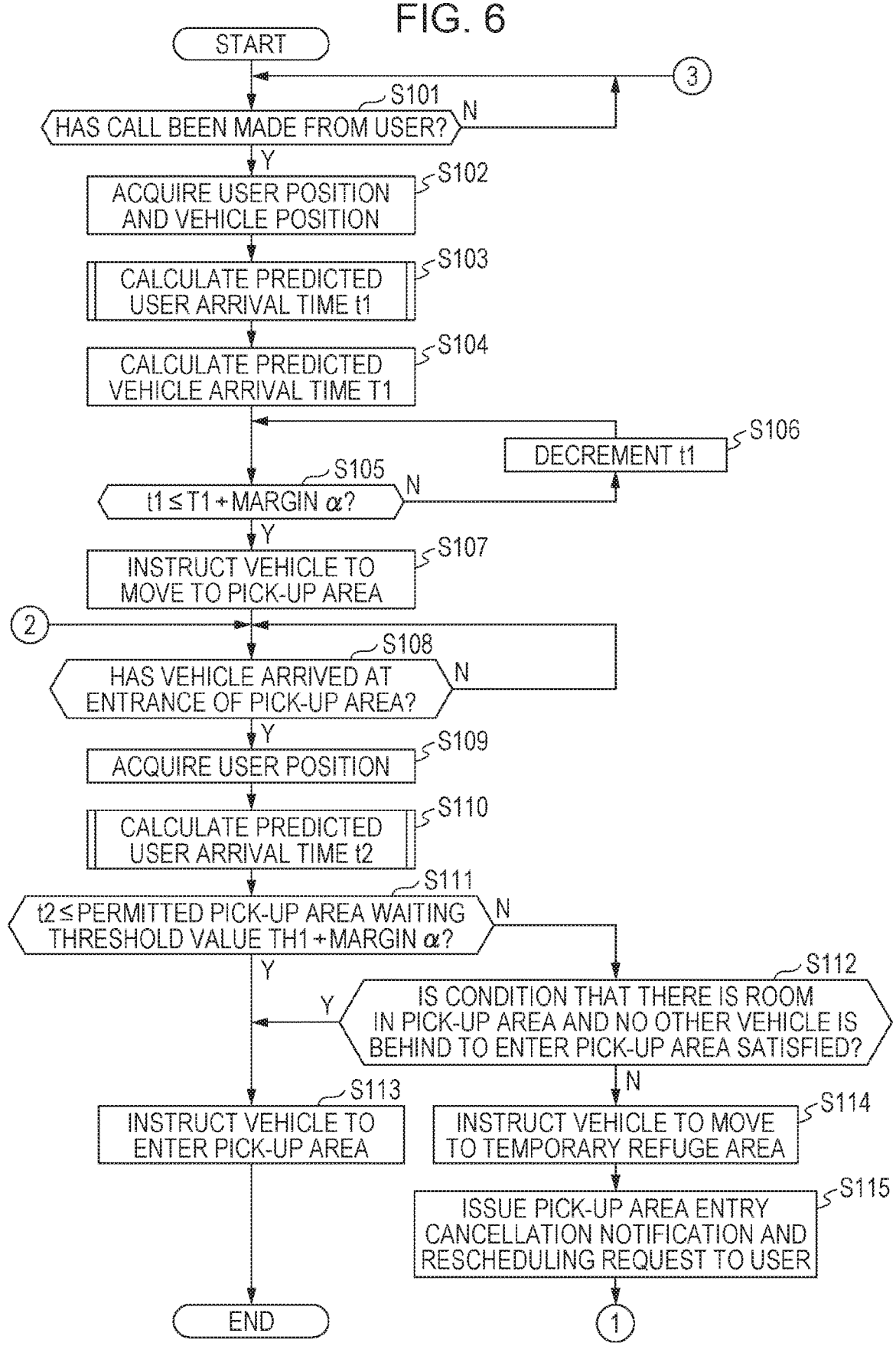
FIG. 6 is a flowchart illustrating a flow of pick-up control processing according to an example.
Figure 7:
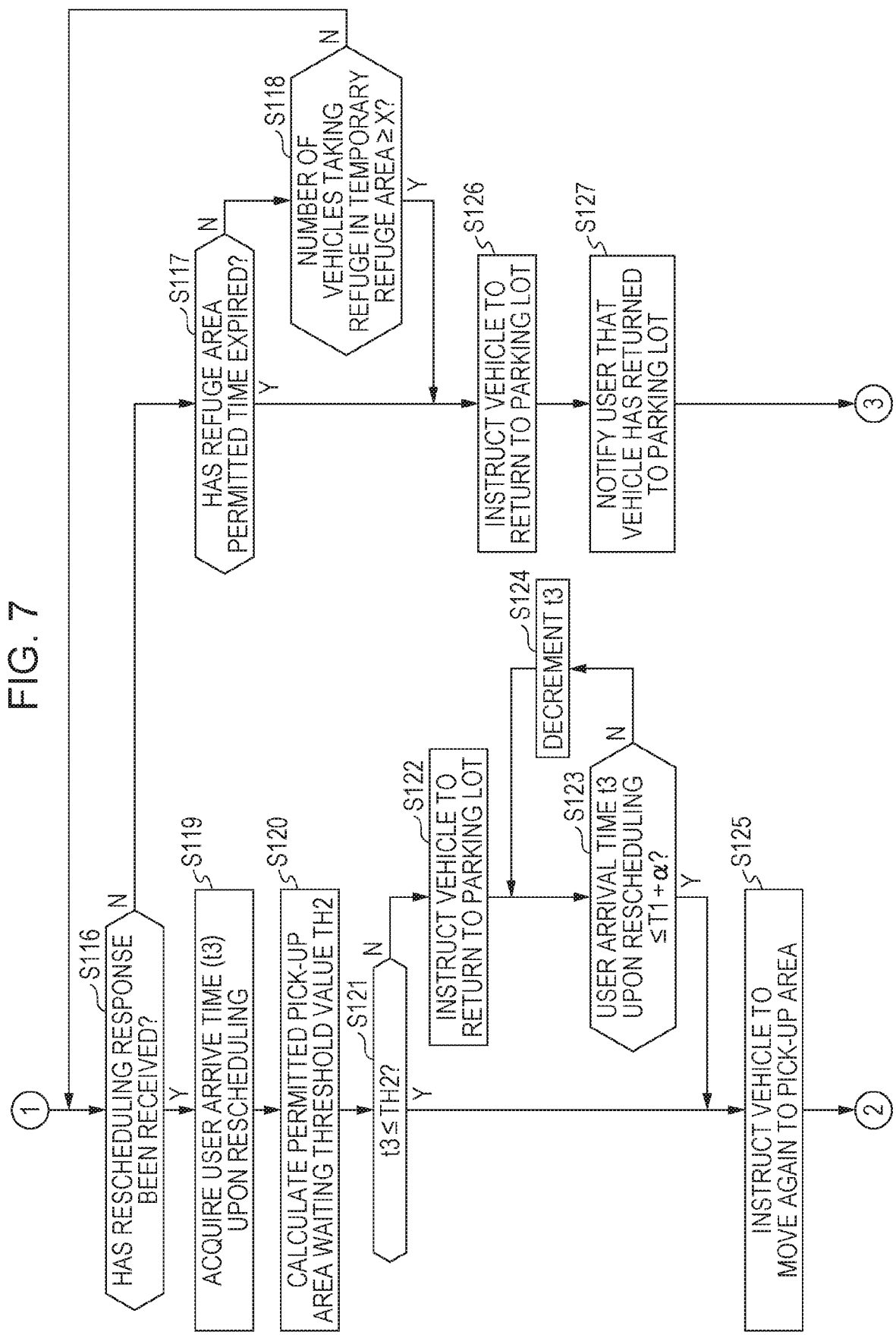
FIG. 7 is a flowchart illustrating, continuing from FIG. 6, a flow of the pick-up control processing according to the example.
Figure 8:
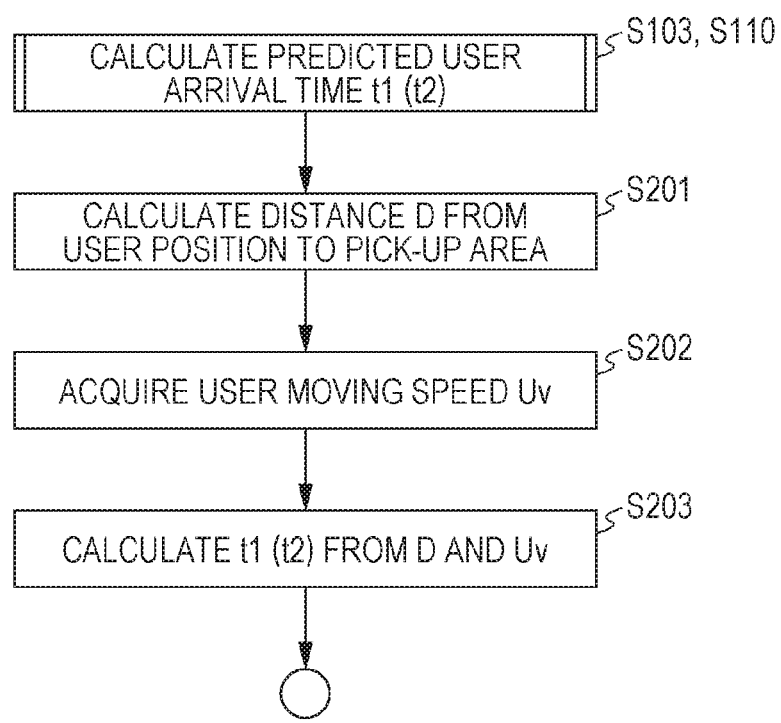
FIG. 8 is a flowchart of processing of calculating a predicted user arrival time.

FIGS. 6 and 7 illustrate a flowchart indicating a flow of the pick-up control processing according to the example, and FIG. 8 illustrates a flowchart of processing of calculating a predicted user arrival time executed during the pick-up control processing. The processing illustrated in FIGS. 6 to 8 is executed by the CPU of the controller 11 in accordance with a program stored, for example, in the ROM or the like described above.

The controller 11 executes the processing illustrated in FIGS. 6 to 8 on each vehicle 2 that uses the pick-up system according to the example.

With reference to FIG. 6, in step S101, the controller 11 stands by for a call from the user. Specifically, the controller 11 stands by for a calling instruction from the user via the mobile terminal 3.

If there is a call from the user, in step S102, the controller 11 acquires a user position and a vehicle position. In other words, the controller 11 acquires, as the user position and the vehicle position, respectively, the current position information detected by the current position detector 36 in the mobile terminal 3 of the user who has made the call and the current position information detected by the current position detector 25 in the vehicle 2 of this user.

In step S103, the controller 11 calculates a predicted user arrival time t1. The predicted user arrival time t1 is a predicted time in which the user who has made the call arrives at the pick-up area Ab from the position where the user has made the call.

With reference to FIG. 8, the calculation processing of the predicted user arrival time t1 will be described.

The predicted user arrival time t1 is calculated on the basis of the distance from the user position to the pick-up area Ab and the moving speed of the user.

Specifically, in step S201, the controller 11 calculates a distance D from the user position to the pick-up area Ab. The positional information of the pick-up area Ab is stored in advance in the ROM or the like of the controller 11, for example.

In step S202, the controller 11 acquires a user moving speed Uv.

For the user moving speed Uv, a value common to all the users can be used, or values corresponding to respective users can be used. In one example, for the value of the user moving speed Uv, a value common to all the users (i.e., a fixed value), such as 5 km/h (typical walking speed), is used.

With regard to the user moving speed Uv, various techniques are conceivable in determining what type of value to be used, and a value learned for each user can, for example, be used. Other examples will be described later.

In step S203, the controller 11 calculates the predicted user arrival time t1 from the distance D and the user moving speed Uv. Specifically, the controller 11 calculates the predicted user arrival time t1 from "D/Uv."

Upon executing the calculation processing in step S203, the controller 11 finishes the calculation processing of the predicted user arrival time t1 and proceeds to step S104 of FIG. 6.

In step S104 of FIG. 6, the controller 11 calculates a predicted vehicle arrival time T1. The predicted vehicle arrival time T1 is calculated on the basis of the distance to the pick-up area Ab and the vehicle traveling speed. Specifically, the predicted vehicle arrival time T1 is calculated from "distance to pick-up area Ab/vehicle traveling speed."

As the distance to the pick-up area Ab, the distance from the vehicle position acquired in step S102 to the pick-up area Ab is used in this example. For the vehicle traveling speed, a value common to all the vehicles 2 can be used, or values corresponding to respective vehicles 2 can be used. In this example, for the value of the vehicle traveling speed, a value common to all the vehicles 2, such as 15 km/h (a speed at which a vehicle can safely travel on a road) is used.

When the controller 11 has a grasp on a parking spot of the vehicle 2 to be called as assumed in this example, the distance to the pick-up area Ab can be calculated as the distance from the aforementioned parking spot to the pick-up area Ab. Thus, it is not essential to acquire the vehicle position in step S102.

In step S105 following step S104, the controller 11 determines whether "t1≤T1+margin α" holds on the basis of the predicted user arrival time t1 and the predicted vehicle arrival time T1. If "t1≤T1+margin α" does not hold, in step S106, the controller 11 decrements the value of the predicted user arrival time t1 and again executes the determination processing in step S105.

If "t1≤T1+margin α" holds, in step S107, the controller 11 instructs the vehicle 2 to move to the pick-up area Ab.

If the vehicle 2 is instructed to move to the pick-up area Ab immediately upon the call being made, the vehicle 2 may arrive at the pick-up area Ab much too early before the user arrives at the pick-up area Ab. As a result, the vehicle 2 may occupy the pick-up area Ab for a long time.

Therefore, in the present example, through the processing in steps S105 to S107 described above, the vehicle 2 is instructed to move to the pick-up area Ab at a timing that takes the predicted user arrival time t1 and the predicted vehicle arrival time T1 into consideration. Thus, the vehicle 2 can be prevented from arriving at the pick-up area Ab much too early before the user arrives at the pick-up area Ab. In other words, the vehicle 2 can be prevented from occupying the pick-up area Ab for a long time, and any congestion at the pick-up area Ab can be eased.

In this example, the margin α is used in determining the timing at which the vehicle 2 starts moving to the pick-up area Ab on the basis of the predicted user arrival time t1 and the predicted vehicle arrival time T1. The margin α functions as an offset value that allows the vehicle 2 to pick up the user at the pick-up area Ab (i.e., the vehicle 2 can arrive at the pick-up area Ab a little earlier than the user). The margin α is set to a duration of, for example, 3 to 5 minutes to prevent the duration in which the vehicle 2 occupies the pick-up area Ab from being extended excessively.

Upon receiving the moving instruction in step S107, the vehicle 2 starts moving to the pick-up area Ab from the parking lot Ap through the autonomous driving function. In this example, the vehicle 2 (autonomous driving controller 21) notifies the control device 1 (controller 11) of the arrival upon arriving at an entrance of the pick-up area Ab. In the vehicle 2, the arrival at the entrance of the pick-up area Ab can be detected on the basis of a recognition result of the environment outside the vehicle 2 recognized with the use of an image captured by the camera unit 22, for example.

In step S108 following step S107, the controller 11 stands by until the vehicle 2 arrives at the entrance of the pick-up area Ab. In other words, the controller 11 waits for notification of the arrival at the entrance of the pick-up area Ab from the vehicle 2.

Upon the vehicle 2 arriving at the entrance of the pick-up area Ab, as user position acquiring processing in step S109, the controller 11 acquires the current position information of the mobile terminal 3 and then calculates a predicted user arrival time t2 in step S110. The calculation processing in step S110 is similar to the calculation processing in step S103 described above with reference to FIG. 8 except that the information acquired in step S109 is used as the user position. Thus, duplicate description thereof will be omitted.

As the predicted user arrival time t2 is calculated in step S110, the progress in the movement of the user toward the pick-up area Ab can be grasped. For example, when the predicted user arrival time t1 and the predicted user arrival time t2 are substantially the same value, it can be understood that the user has not gotten much closer to the pick-up area Ab since the time when the call has been made.

In step S111 following step S110, the controller 11 determines whether the predicted user arrival time t2 is no greater than "permitted pick-up area waiting threshold value TH1+margin α" (whether t2≤TH1+α holds).

The permitted pick-up area waiting threshold value TH1 is a value for which at least a permitted waiting time at the pick-up area Ab (e.g., the time determined in accordance with the size or the like of the pick-up area Ab) is used. When the distance from the entrance of the pick-up area Ab to a user waiting area in the pick-up area Ab is relatively large, the threshold value TH1 may be set to a value to which the time it takes for the vehicle to move from the entrance to the user waiting area is further added.

The determination in step S111 corresponds to determining whether the waiting time of the vehicle 2 at the pick-up area Ab until the user arrives is no greater than "permitted pick-up area waiting threshold value TH1+margin α" if the vehicle 2 enters the pick-up area Ab at the current moment. In this case as well, the margin α is used as a value that allows the vehicle 2 to arrive before the user arrives. Because the time in which the user moves to the pick-up area Ab is expected to be shorter than that held when the call has been made, the margin α in step S111 may be set to a value smaller than the value used when the call has been made (the value used in step S105).

If "t2≤TH1+α" holds in step S111, the controller 11, proceeding to step S113, instructs the vehicle 2 to enter the pick-up area Ab and terminates the series of processing illustrated in FIGS. 6 and 7.

In other words, the vehicle 2 of which the user is estimated to arrive at the pick-up area Ab soon after the timing at which the vehicle 2 arrives at the entrance of the pick-up area Ab (the timing after the vehicle 2 has started moving to the pick-up area Ab but before the vehicle 2 enters the pick-up area Ab) is instructed to enter the pick-up area Ab.

If "t2≤TH1+α" does not hold in step S111, the controller 11, proceeding to step S112, determines whether the condition that there is room in the pick-up area Ab and no other vehicle is behind the vehicle 2 to enter the pick-up area Ab is satisfied. In other words, the controller 11 determines whether the following condition is satisfied. Specifically, the number of vehicles 2 that are currently waiting for their users at the pick-up area Ab is smaller than the number of vehicles 2 that can be housed in the pick-up area Ab, and there is no other vehicle 2 that is to enter the pick-up area Ab.

If the determination result in step S112 is affirmative, in other words, if the condition that there is room in the pick-up area Ab and no other vehicle is behind to enter the pick-up area Ab is satisfied, the controller 11, proceeding to step S113 described above, instructs the vehicle 2 to enter the pick-up area Ab. In other words, even in a case in which it is estimated that the user will not have arrived at the pick-up area Ab at the timing when the vehicle 2 arrives at the entrance of the pick-up area Ab, the vehicle 2 is allowed to enter the pick-up area Ab (allowed to wait for the user at the pick-up area Ab) if there is room in the pick-up area Ab and if no other vehicle is behind to enter the pick-up area Ab.

Meanwhile, if the determination result in step S112 is negative, the controller 11, proceeding to step S114, instructs the vehicle 2 to move to the temporary refuge area Ae. In other words, in a case in which it is estimated that the user will not have arrived at the pick-up area Ab at a timing after the vehicle 2 has started moving toward the pick-up area Ab and before the vehicle 2 enters the pick-up area Ab and in a case in which there is no room in the pick-up area Ab or there is room in the pick-up area Ab but another vehicle is behind to enter the pick-up area Ab, the vehicle 2 is not allowed to enter the pick-up area Ab and is moved to the temporary refuge area Ae.

Then, in step S115, the controller 11 issues a pick-up area entry cancellation notification and a rescheduling request to the user. In other words, the controller 11 transmits, to the mobile terminal 3, a notification indicating that the pick-up by the vehicle at the pick-up area Ab in response to the call has been cancelled and a request prompting the user to enter schedule information about the user's arrival at the pick-up area Ab.

Upon receiving the notification and the request, the mobile terminal 3 (controller 31) displays information indicating that the pick-up by the vehicle has been cancelled in the display device of the output unit 35 and displays an input screen for inputting the schedule information. If the schedule information is input to the input screen, the mobile terminal 3 transmits the schedule information to the controller 11.

In this example, as the schedule information, one of the time at which the user is scheduled to arrive at the pick-up area Ab and the time in which the user is scheduled to arrive at the pick-up area Ab (an expected value of the time it takes for the user to arrive) is input.

Upon executing the processing in step S115, the controller 11 proceeds to step S116 illustrated in FIG. 7.

With reference to FIG. 7, in step S116, the controller 11 determines whether a rescheduling response has been received, that is, whether the schedule information has been received from the mobile terminal 3. If no rescheduling response has been received (if no schedule information has been received), in step S117, the controller 11 determines whether a refuge area permitted time has expired, that is, whether the waiting time of the vehicle 2 that has move to the temporary refuge area Ae has exceeded the refuge area permitted time set in advance.

If it is determined in step S117 that the refuge area permitted time has not expired, in step S118, the controller 11 determines whether the number of vehicles taking refuge in the temporary refuge area Ae is no smaller than "x," that is, whether the number of vehicles taking refuge has reached a prescribed value x. If the number of the vehicles taking refuge is no smaller than "x," the controller 11 returns to step S116.

The processing in step S116 to S118 forms a loop in which the controller 11 stands by until one of the following conditions is met: the rescheduling response has been received, the refuge area permitted time has expired, and the number of vehicles taking refuge in the temporary refuge area Ae is no smaller than "x." The vehicle 2 waits in the temporary refuge area Ae during this loop.

If it is determined in step S116 that the rescheduling response has been received, the controller 11, proceeding to step S119, acquires a user arrival time t3 upon rescheduling. For example, when the schedule information described above is information on the time at which the user is scheduled to arrive at the pick-up area Ab, the time difference between the scheduled arrival time and the current time is acquired as the user arrival time t3. Alternatively, when the schedule information is the time in which the user is scheduled to arrive at the pick-up area Ab, this time is acquired as the user arrival time t3.

Then, in step S120, the controller 11 calculates a permitted pick-up area waiting threshold value TH2. The permitted pick-up area waiting threshold value TH2 is calculated by adding "a permitted waiting time at the pick-up area Ab" to "the time it takes for the vehicle 2 to move from the temporary refuge area Ae to the pick-up area Ab." A fixed value is used for "the time it takes for the vehicle 2 to move from the temporary refuge area Ae to the pick-up area Ab" in this example. "The permitted waiting time at the pick-up area Ab" is, for example, a value determined in accordance with the size or the like of the pick-up area Ab, as described above, and is set to 5 to 10 minutes, for example.

In step S121 following step S120, the controller 11 determines whether the user arrival time t3 upon rescheduling is no greater than the permitted pick-up area waiting threshold value TH2 (whether "t3≤TH2" holds). This determination corresponds to determining whether the waiting time until the user arrival exceeds the permitted waiting time at the pick-up area Ab if the vehicle 2 is allowed to enter the pick-up area Ab at the current moment.

If "t3≤TH2" holds in step S121, in step S125, the controller 11 instructs the vehicle 2 to move again to the pick-up area Ab. In other words, when the user is expected to arrive soon on the basis of the user arrival time t3 upon rescheduling, the vehicle 2 in the temporary refuge area Ae is moved again to the pick-up area Ab.

Upon instructing the vehicle 2 to move again in step S125, the controller 11 returns to step S108 illustrated in FIG. 6. Thus, whether the vehicle 2 that has moved again to the pick-up area Ab has arrived at the entrance of the pick-up area Ab is monitored (S108), the predicted user arrival time t2 is calculated again when the vehicle 2 has arrived at the entrance (S110), and the entry of the vehicle 2 into the pick-up area Ab is determined (S111, S112). In this case as well, if the determination result in step S111 or S112 is affirmative, the vehicle 2 is instructed to enter the pick-up area Ab (S113).

Meanwhile, if "t3≤TH2" does not hold in step S121 of FIG. 7, that is, if the user is expected to arrive late, the controller 11, proceeding to step S122, instructs the vehicle 2 to return to the parking lot Ap.

Then, in step S123, the controller 11 determines whether the user arrival time t3 upon rescheduling is no greater than "predicted vehicle arrival time T1+margin α" (whether "t3≤T1+α" holds). If "t3≤T1+α" does not hold, in step S124, the controller 11 decrements the value of the user arrival time t3 and again executes the determination processing in step S123.

If "t3≤T1+α" holds, that is, if it is confirmed that the vehicle 2 will not wait for the user for a long time (the time in which the vehicle 2 occupies the pick-up area Ab) even if the vehicle 2 is allowed to enter the pick-up area Ab at the current moment, the controller 11, proceeding to step S125, instructs the vehicle 2 to move again to the pick-up area Ab.

With reference to FIG. 7, if it is determined in step S117 that the refuge area permitted time has expired or if it is determined in step S118 that the number of vehicles taking refuge in the temporary refuge area Ae is no smaller than "x," in step S126, the controller 11 instructs the vehicle 2 to return to the parking lot Ap. Then, in step S127, the controller 11 notifies the user of the return to the parking lot Ap and returns to step S101 of FIG. 6.

The user in this case, that is, the user who neither arrives at the pick-up area Ab even after a relatively long time has passed after making the call nor responds to the rescheduling request needs to make a call again to have the vehicle 2 pick up the user. If a call is made again, the processing in step S102 and thereafter is executed again.

5. Acquiring Moving Speed of User

As described above, for the user moving speed Uv, a value based on information that the vehicle 2 has learned about the moving speed of the user can be used.

For example, the user moving speed Uv can be a value of a mean moving speed of the user that the vehicle 2 has learned. In this case, the vehicle 2 calculates the mean moving speed on the basis of the duration from when the user makes a call to when the user actually arrives at the pick-up area Ab and the distance from the point where the call is made to the pick-up area Ab. Specifically, each time the establishment to which the pick-up system is applied is used, the vehicle 2 acquires, from the control device 1, the moving distance of the user (the distance from the user position acquired when the call is made to the pick-up area Ab) and the time required for the user to arrive at the pick-up area Ab from where the call is made and calculates the mean moving speed of the user on the basis of the sum total of the moving distance of the user and the sum total of the time required for the user to move that distance. "The establishment to which the pick-up system is applied" is a not limited to a single establishment and is a concept that includes a plurality of establishments.

In this case, the control device 1 acquires the mean moving speed of the user that the vehicle 2 has learned as described above as "the user moving speed Uv." Alternatively, the control device 1 may acquire, as the user moving speed Uv, a value obtained by multiplying the user walking speed having a fixed value by a coefficient corresponding to the acquired mean moving speed of the user.

The control device 1 in this case calculates the moving distance of the user and measures the time required for the move each time a call is made by the user and transmits these pieces of information to the vehicle 2 to be called.

Alternatively, the information that the vehicle 2 learns about the user moving speed Uv can be, more roughly, information as to whether the user moves at a low speed. For example, the user who frequently receives the rescheduling request described above can be estimated to be a user who tends to move at a lower speed. Therefore, for example, the control device 1 that has made a rescheduling request to the user notifies the vehicle 2 to that effect, and the vehicle 2 generates, as moving speed correlation information, information indicating the frequency at which the rescheduling request has been made (e.g., the number of instances the rescheduling request has been made/the frequency the establishment is used).

When a call is made by the user, the control device 1 acquires the moving speed correlation information from the vehicle 2 to be called and acquires the user moving speed Uv by multiplying the user walking speed having a fixed value by a coefficient corresponding to the acquired moving speed correlation information, for example.

The information as to the magnitude of the user moving speed to be leaned by the vehicle 2 is not limited to information indicating two levels of "high" and "low" and can be information indicating three or more levels.

In the foregoing example, the information indicating the stepwise magnitude of the user moving speed is generated on the basis of the number of instances the rescheduling request is made. Alternatively, the information can be generated through any other method. For example, the information can be generated on the basis of the mean moving speed of the user described above. In a case in which the information is generated on the basis of the number of instances the rescheduling request is made as illustrated above, a processing load on the control device 1 for calculating the moving distance of the user to the pick-up area Ab or for measuring the time required for the move can be reduced.

The user moving speed Uv can be a value that takes into consideration whether it is a time period busy with customers (e.g., a time period in which the customers need to wait longer than usual for an elevator) or whether it is an establishment that tends to be crowded. For example, if it is a busy time period or a busy establishment, a value obtained by subtracting a predetermined value from the user walking speed having a fixed value (or a value obtained by multiplying the user walking speed having a fixed value by a coefficient to produce a lower speed) can be acquired as the user moving speed Uv.

The user moving speed Uv can be calculated on the basis of the amount or the size of merchandise purchased by the user at the establishment. For example, the amount or the size of the purchased merchandise can be estimated on the basis of the type of the store where the merchandise is purchased and information on the purchase price at the store.

In this example, the mobile terminal 3 has a function of making a payment with electronic money as described above, and the information on the purchase price is estimated from the information on the monetary amount paid with electronic money. In other words, the mobile terminal 3 in this case transmits the information on the paid monetary amount to the control device 1 when the payment is made with electronic money. The control device 1 estimates the type of the store where the merchandise is purchased by acquiring the positional information of the mobile terminal 3 held when the merchandise is purchased (when the payment is made with electronic money). For each user, the control device 1 holds, as purchase management information, information on the type of the store where merchandise is purchased and the monetary amount paid at that store (monetary amount paid for the purchase). When the user calls for a vehicle, the control device 1 calculates, as "an amount and size correlation value," the value correlating to the amount and the size of the purchased merchandise on the basis of the purchase management information. This amount and size correlation value is calculated basically such that the value is greater when merchandise is purchased at a store that sells large-size merchandise and such that the value is greater as the monetary amount paid for the purchase is greater.

The control device 1 in this case acquires the user moving speed Uv of the user who has made a call on the basis of the user walking speed having a fixed value and the amount and size correlation value, for example. Specifically, the value of the user walking speed is corrected such that the user moving speed Uv is lower as the amount and size correlation value is greater (i.e., as the amount and the size of purchased merchandise are greater).

Thus, the user moving speed Uv that appropriately corresponds to the amount and the size of the baggage carried by the user can be acquired, and the vehicle 2 can be moved to the pick-up area Ab at a more appropriate timing. In other words, the duration in which the vehicle 2 that has arrived at the pick-up area Ab occupies the pick-up area Ab while waiting for the user to arrive can be reduced, and the possibility that the congestion at the pick-up area Ab is eased can be increased.

The user moving speed Uv can be a value that is based on the passenger composition of the vehicle 2. For example, when the passengers include a child, a lower user moving speed Uv can be used. Whether the passengers include a child can be determined on the basis of information indicating the presence of a child safety seat to be mounted in the vehicle 2, for example.

Alternatively, it is conceivable to lower the user moving speed Uv as the number of passengers increases. The number of passengers in the vehicle 2 is acquired from the information on the number of sitting passengers obtained from the vehicle 2 (e.g., the number of sitting passengers at the time when the vehicle 2 arrives at the drop-off area). Whether the passengers are sitting in the vehicle 2 can be detected by a sitting sensor provided in a seat (e.g., pressure-sensitive sensor) or on the basis of an image captured by a camera that captures an image inside the vehicle compartment.

6. Modifications

In the foregoing, to determine whether the vehicle 2 has arrived at the entrance of the pick-up area Ab (hereinafter, referred to as arrival determination processing), it is determined whether an arrival notification is received from the vehicle 2. Alternatively, in the arrival determination processing, for example, if a gate is provided at the entrance of the pick-up area Ab, a sensor, such as a camera, that can acquire information on the license plate of the vehicle 2, for example, may be provided, and whether the target vehicle 2 has arrived at the entrance may be determined on the basis of the acquired license plate information. In this case, the user sets the license plate information in advance in the application for the pick-up system, and the control device 1 acquires the license plate information from the mobile terminal 3 in response to a call from the user, for example. Thus, the control device 1 can determine whether the vehicle that has arrived at the gate is the target vehicle 2.

In the foregoing, the assumption is that the pick-up system according to the present example is applied to an automated valet parking system and the vehicle 2 moves to or parks itself in the parking lot Ap through autonomous driving. Alternatively, the pick-up system according to the example can be suitably applied to a case in which the vehicle 2 is moved to the parking lot Ap and/or is parked in a parking spot as the driver drives the vehicle 2.

In the foregoing example, to determine the timing at which the vehicle 2 starts moving to the pick-up area Ab, the predicted vehicle arrival time T1 is calculated (S104), but it is not essential to calculate the predicted vehicle arrival time T1. For example, if an establishment has a relatively small parking lot Ap, the moving time from the parking lot Ap to the pick-up area Ab can be a value common to all the vehicles. Such a case can make it unnecessary to calculate the predicted vehicle arrival time T1.

In the foregoing example, to determine whether the vehicle 2 can be moved to the pick-up area Ab in response to the call from the user (S105), the predicted user arrival time t1 is calculated only once on the basis of the user position at the time when the call is made alone until the determination that the vehicle 2 can be moved to the pick-up area Ab is made. Alternatively, the predicted user arrival time t1 can be calculated a plurality of times until the determination that the vehicle 2 can be moved to the pick-up area Ab is made. Specifically, in the example illustrated in FIG. 6, in response to obtaining the negative determination result in step S105, the processing returns to step S102. Thus, until the affirmative determination result is obtained in step S105, the predicted user arrival time t1 is calculated each time on the basis of the user position acquired from the mobile terminal 3.

This makes it possible to instruct the vehicle 2 to move to the pick-up area Ab in response to the user actually reaching a position close to the pick-up area Ab from the position held when the user has made a call. Therefore, the accuracy of the determination as to the whether the vehicle 2 can move to the pick-up area Ab increases, and the possibility that the congestion at the pick-up area Ab is eased can be increased.

7. Recapitulation of Examples

As described above, a control device (control device 1) according to an example is configured to cause a vehicle (vehicle 2) parked in a parking lot (parking lot Ap) to move to a pick-up area (pick-up area Ab) in accordance with a call from a user who is a passenger. The control device may serve as a "user position acquiring unit" (controller 11: S102) configured to acquire, as a user position, a current position of the user who has made the call; a "predicted time calculator" (controller 11: S103) configured to calculate a predicted user arrival time (predicted user arrival time t1) on the basis of the user position, the predicted user arrival time being a time in which the user is predicted to arrive at the pick-up area; and a "timing manager" (controller 11: S104 to S106) configured to manage a movement start timing at which the vehicle to be called starts moving to the pick-up area on the basis of the predicted user arrival time.

The control device of the above-described configuration does not cause the vehicle to move to the pick-up area immediately upon the condition that the call is made but can manage the movement start timing at which the vehicle starts moving to the pick-up area in accordance with the time in which the user is predicted to arrive at the pick-up area.

Therefore, the vehicle that has arrived at the pick-up area can be prevented from occupying the pick-up area for a long time while waiting for the user to arrive, and any congestion at the pick-up area can be eased.

In the control device according to the example, the timing manager determines the movement start timing on the basis of the predicted user arrival time and a time obtained by adding a predetermined margin (margin $\alpha$) to a predicted vehicle arrival time (predicted vehicle arrival time T1), the predicted vehicle arrival time being a time required for the called vehicle to move to the pick-up area (S104 to S106).

Thus, the vehicle arrives at the pick-up area earlier by the time corresponding to the margin than the user arrives at the pick-up area.

Therefore, the user who has arrived at the pick-up area can be prevented from waiting for the vehicle to arrive, and a pick-up system with high functionality of reducing the waiting time of the user can be achieved.

The control device according to the example further includes a predicted time recalculator (controller 11: S110) configured to recalculate the predicted user arrival time by acquiring the user position after the vehicle has started moving to the pick-up area and before the vehicle enters the pick-up area, and an entry determiner (controller 11: S111) configured to determine whether to allow the vehicle to enter the pick-up area on the basis of the recalculated predicted user arrival time.

It is not assured that the predicted user arrival time predicted when the vehicle starts moving to the pick-up area accurately indicates the time in which the user actually arrives at the pick-up area. This is because there may be a case in which the user does not directly head for the pick-up area as planned after calling for the vehicle. For example, the user may go back to buy an additional piece of merchandise after calling for the vehicle. Thus, the predicted user arrival time is recalculated on the basis of the user position newly acquired before the vehicle enters the pick-up area, and whether to allow the vehicle to enter the pick-up area is determined on the basis of the recalculated predicted user arrival time.

Thus, if it is determined that the user will arrive late on the basis of the recalculated predicted user arrival time, it is possible not to allow the vehicle to enter the pick-up area. Therefore, the possibility that the congestion at the pick-up area is eased can be increased as compared to a case in which only the movement start timing is managed on the basis of the predicted user arrival time.

The control device according to the example further includes a refuge instructing unit (controller 11: S114)

configured to instruct the vehicle to move to a temporary refuge area (temporary refuge area Ae) in a case in which the entry determiner has determined that the vehicle is not allowed to enter the pick-up area.

If the vehicle that is not allowed to enter the pick-up area is returned to the parking lot, the distance to the pick-up area increases. If the user who is being late promptly arrives at the pick-up area thereafter, the user may be kept waiting at the pick-up area for a relatively long time.

Therefore, as the vehicle is moved to the temporary refuge area, which is not the parking lot, even if the user who is being late promptly arrives at the pick-up area, the time required for the vehicle to move to the pick-up area can be reduced, and the possibility that the user is kept waiting at the pick-up area for a long time can be reduced.

Therefore, a pick-up system with high functionality of reducing the waiting time of the user can be achieved.

The control device according to the example further includes a return instructing unit (controller 11: S117, S118, S126) configured to instruct the vehicle to return to the parking lot on the basis of one of a waiting time of the vehicle at the temporary refuge area and a congestion state of vehicles in the temporary refuge area held after the vehicle has been instructed to move to the temporary refuge area.

Thus, the number of the vehicles taking refuge in the temporary refuge area can be managed not to exceed a prescribed number of vehicles.

This, therefore, can prevent a situation in which vehicles moving between the parking lot and the pick-up area hinder passage of other vehicles as the vehicles overflow from the temporary refuge area to block the path to the pick-up area, and a situation that renders efficient control impossible can be prevented.

In the control device according to the example, the predicted time calculator calculates the predicted user arrival time on the basis of the user position and a user moving speed (user moving speed Uv) and uses, as the user moving speed, a value that is based on information that the vehicle has learned about a moving speed of the user.

Thus, the information that the vehicle has learned about the moving speed of the user is reflected on the moving speed of the user to be used in calculating the predicted user arrival time.

Therefore, the accuracy of the predicted user arrival time can be improved, and an effect of preventing the congestion at the pick-up area can be increased.

As described above, according to the present example and the modifications, a vehicle that has arrived at the pick-up area can be prevented from occupying the pick-up area for a long time while waiting for the user to arrive, and any congestion at the pick-up area can be eased.

The invention claimed is:

1. A control device configured to cause a vehicle parked in a parking lot to move to a pick-up area in accordance with a call from a user who is a passenger of the vehicle, the control device comprising:
   a user position acquiring unit configured to acquire, as a user position, a current position of the user who has made the call;
   a predicted time calculator configured to calculate a predicted user arrival time on a basis of the user position, the predicted user arrival time being a time in which the user is predicted to arrive at the pick-up area;
   a timing manager configured to manage a movement start timing at which the vehicle to be called starts moving to the pick-up area on a basis of the predicted user arrival time;
   a predicted time recalculator configured to recalculate the predicted user arrival time by acquiring the user position after the vehicle has started moving to the pick-up area and before the vehicle enters the pick-up area; and
   an entry determiner configured to determine whether to allow the vehicle to enter the pick-up area on a basis of the recalculated predicted user arrival time,
   wherein 1) when the recalculated user arrival time exceeds a permitted pick-up area waiting time threshold and 2) when a condition i) that the pick-up area has room to accommodate the vehicle and ii) that no other vehicle is waiting to enter the pick-up area is satisfied, the entry determiner allows the vehicle to enter the pick-up area.

2. The control device according to claim 1, wherein the timing manager determines the movement start timing on a basis of the predicted user arrival time and a time obtained by adding a predetermined margin to a predicted vehicle arrival time, the predicted vehicle arrival time being a time required for the called vehicle to move to the pick-up area.

3. The control device according to claim 1,
   wherein when the recalculated user arrival time is less than or equal to the permitted pick-up area waiting time threshold, the entry determiner allows the vehicle to enter the pick-up area, and
   wherein when the recalculated user arrival time exceeds the permitted pick-up area waiting time threshold and the condition is not satisfied, the entry determiner does not allow the vehicle to enter the pick-up area.

4. The control device according to claim 2,
   wherein when the recalculated user arrival time is less than or equal to the permitted pick-up area waiting time threshold, the entry determiner allows the vehicle to enter the pick-up area, and
   wherein when the recalculated user arrival time exceeds the permitted pick-up area waiting time threshold and the condition is not satisfied, the entry determiner does not allow the vehicle to enter the pick-up area.

5. The control device according to claim 3, further comprising:
   a refuge instructing unit configured to instruct the vehicle to move to a temporary refuge area in a case where the entry determiner has determined that the vehicle is not allowed to enter the pick-up area.

6. The control device according to claim 4, further comprising:
   a refuge instructing unit configured to instruct the vehicle to move to a temporary refuge area in a case where the entry determiner has determined that the vehicle is not allowed to enter the pick-up area.

7. The control device according to claim 5, further comprising:
   a return instructing unit configured to instruct the vehicle to return to the parking lot on a basis a waiting time of the vehicle at the temporary refuge area or a congestion state of vehicles in the temporary refuge area held after the vehicle has been instructed to move to the temporary refuge area.

8. The control device according to claim 6, further comprising:
   a return instructing unit configured to instruct the vehicle to return to the parking lot on a basis a waiting time of the vehicle at the temporary refuge area or a congestion state of vehicles in the temporary refuge area held after the vehicle has been instructed to move to the temporary refuge area.

9. The control device according to claim 1, wherein the predicted time calculator calculates the predicted user arrival time on a basis of the user position and a user moving speed, and uses, as the user moving speed, a moving speed of the user that is based on information that the vehicle has learned about the user.

10. The control device according to claim 2, wherein the predicted time calculator calculates the predicted user arrival time on a basis of the user position and a user moving speed and uses, as the user moving speed, a moving speed of the user that is based on information that the vehicle has learned about the user.

11. The control device according to claim 3, wherein the predicted time calculator calculates the predicted user arrival time on a basis of the user position and a user moving speed and uses, as the user moving speed, a moving speed of the user that is based on information that the vehicle has learned about the user.

12. The control device according to claim 4, wherein the predicted time calculator calculates the predicted user arrival time on a basis of the user position and a user moving speed and uses, as the user moving speed, a moving speed of the user that is based on information that the vehicle has learned about the user.

13. The control device according to claim 5, wherein the predicted time calculator calculates the predicted user arrival time on a basis of the user position and a user moving speed and uses, as the user moving speed, a moving speed of the user that is based on information that the vehicle has learned about the user.

14. The control device according to claim 6, wherein the predicted time calculator calculates the predicted user arrival time on a basis of the user position and a user moving speed and uses, as the user moving speed, a moving speed of the user that is based on information that the vehicle has learned about the user.

15. The control device according to claim 7, wherein the predicted time calculator calculates the predicted user arrival time on a basis of the user position and a user moving speed and uses, as the user moving speed, a moving speed of the user that is based on information that the vehicle has learned about the user.

16. The control device according to claim 8, wherein the predicted time calculator calculates the predicted user arrival time on a basis of the user position and a user moving speed and uses, as the user moving speed, a moving speed of the user that is based on information that the vehicle has learned about the user.

17. A control device configured to cause a vehicle parked in a parking lot to move to a pick-up area in accordance with a call from a user who is a passenger of the vehicle, the control device comprising circuitry configured to:
  acquire, as a user position, a current position of the user who has made the call;
  calculate a predicted user arrival time on a basis of the user position, the predicted user arrival time being a time in which the user is predicted to arrive at the pick-up area;
  manage a movement start timing at which the vehicle to be called starts moving to the pick-up area on a basis of the predicted user arrival time
  recalculate the predicted user arrival time by acquiring the user position after the vehicle has started moving to the pick-up area and before the vehicle enters the pick-up area; and
  determine whether to allow the vehicle to enter the pick-up area on a basis of the recalculated predicted user arrival time,
  wherein when the recalculated user arrival time is less than or equal to a permitted pick-up area waiting time threshold, the vehicle to is allowed enter the pick-up area,
  wherein 1) when the recalculated user arrival time exceeds the permitted pick-up area waiting time threshold and 2) when a condition i) that the pick-up area has room to accommodate the vehicle and ii) that no other vehicle is waiting to enter the pick-up area is satisfied, the vehicle to is allowed enter the pick-up area, and
  wherein when the recalculated user arrival time exceeds the permitted pick-up area waiting time threshold and the condition is not satisfied, the vehicle is not allowed to enter the pick-up area.

* * * * *